United States Patent
Iwahashi et al.

(10) Patent No.: US 7,410,922 B2
(45) Date of Patent: Aug. 12, 2008

(54) SILICA GLASS CONTAINING TIO₂ AND PROCESS FOR ITS PRODUCTION

(75) Inventors: Yasutomi Iwahashi, Yokohama (JP); Akio Koike, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 79 days.

(21) Appl. No.: 11/172,872

(22) Filed: Jul. 5, 2005

(65) Prior Publication Data

US 2005/0245382 A1 Nov. 3, 2005

Related U.S. Application Data

(63) Continuation of application No. PCT/JP2004/004833, filed on Apr. 2, 2004.

(30) Foreign Application Priority Data

| Apr. 3, 2003 | (JP) | ............................. 2003-100495 |
| Jun. 10, 2003 | (JP) | ............................. 2003-164669 |
| Mar. 9, 2004 | (JP) | ............................. 2004-065275 |

(51) Int. Cl.
  *C03C 3/06* (2006.01)
  *C03C 3/076* (2006.01)
  *C03B 20/00* (2006.01)

(52) U.S. Cl. .......................... 501/54; 501/55

(58) Field of Classification Search .................... 501/54, 501/69, 55

See application file for complete search history.

(56) References Cited

U.S. PATENT DOCUMENTS

| 2,326,059 | A | * | 8/1943 | Nordberg ...................... 501/94 |
| 5,970,751 | A | | 10/1999 | Maxon et al. |
| 6,143,676 | A | | 11/2000 | Ohashi et al. |
| 6,465,272 | B1 | | 10/2002 | Davis et al. |
| 6,576,380 | B2 | | 6/2003 | Davis et al. |
| 2002/0157421 | A1 | | 10/2002 | Ackerman et al. |
| 2005/0245382 | A1 | | 11/2005 | Iwahashi et al. |

FOREIGN PATENT DOCUMENTS

| EP | 0 401 845 | | 12/1990 |
| JP | 60-176945 | A * | 9/1985 |
| WO | WO99/15468 | A * | 4/1999 |

OTHER PUBLICATIONS

U.S. Appl. No. 11/589,875, filed Oct. 31, 2006, Koike, et al.
U.S. Appl. No. 11/172,872, filed Jul. 5, 2005, Iwahashi, et al.
U.S. Appl. No. 11/174,533, filed Jul. 6, 2005, Iwahashi, et al.
U.S. Appl. No. 11/172,950, filed Jul. 5, 2002, Iwahashi, et al.
U.S. Appl. No. 11/435,887, filed May 18, 2006, Iwahashi, et al.
Hayashi, et al., "The Development of Synthetic Silica Glass by VAD Method", Sumitomo Metals Technical Magazine, vol. 43, No. 3, pp. 27-38. 1990. (w/partial English translation), no month.
Hayashi, et al., "The Development of Synthetic Silica Glass by VAD Method", Sumitomo Metals Technical Magazine, vol. 42, No. 3, pp. 27-38. 1990, no month.
Copley, et al., "The influence of titania upon the thermal expansion of vitreous silica", Physics and Chemistry of Glasses, vol. 14, No. 4 (1973), pp. 73-76, no month.
Schultz, et al., "Ultra-low-Expansion Glasses and Their Structure in the SiO2-TiO2 System", Amorphous Materials, P.W. Douglas and Brian Ellis, Ed.s., (John Wiley and Sons Ltd, 1972), pp. 111-119, no month.
Sakaguchi, et al., "Rayleigh Scattering of silica glass and Silica Fibers with heat treatment", Proc. Int. Workshop on Silica Glasses, Jpn. J. Appl. Phys. vol. 37, (1998), Suppl. 37-1, pp. 56-58, no month.
Corning Code 971 Glass Bulletin [Date = 12-90-2000], pp. 59-78.
Shelby, "Introduction to Glass Science and Technology, 2$^{nd}$ Ed.," (Royal Society of Chemistry, Cambridge, U.K., 2005), pp. 1-6 and 131-133 (Section 7), no month.
J. F. Shackelford, et al., J. Amer. Ceramic Soc., vol. 53, (1970), p. 417, no month.

* cited by examiner

*Primary Examiner*—Anthony J Green
(74) *Attorney, Agent, or Firm*—Oblon, Spivak, McClelland, Maier & Neustadt, P.C.

(57) ABSTRACT

A silica glass containing $TiO_2$, which has a fictive temperature of at most 1,200° C., an OH group concentration of at most 600 ppm and a coefficient of thermal expansion of 0±200 ppb/° C. from 0 to 100° C.

8 Claims, 1 Drawing Sheet

SILICA GLASS CONTAINING TIO$_2$ AND PROCESS FOR ITS PRODUCTION

TECHNICAL FIELD

The present invention relates to a silica glass containing TiO$_2$ (hereinafter referred to as TiO$_2$—SiO$_2$ glass) and a process for its production. Particularly, it relates to TiO$_2$—SiO$_2$ glass to be used for an optical material for an exposure device to be used for EUV lithography and a process for its production. In the present invention, EUV (Extreme Ultra Violet) light means light having a waveband in a soft X-ray region or in a vacuum ultraviolet region and specifically means light having a wavelength of from 0.2 to 100 nm.

BACKGROUND ART

Heretofore, in photolithography, it is common to employ an exposure device to transfer a fine circuit pattern onto a wafer to produce an integrated circuit. Along with high integration and high functionality of integrated circuits, microsizing of integrated circuit has been progressing, and an exposure device is required to form an image of a circuit pattern on a wafer with a high resolution in a deep focal depth, whereby blue shift of the exposure light source is in progress. The exposure light source has been advanced from the conventional g-line (wavelength: 436 nm), i-line (wavelength: 365 nm) or KrF excimer laser (wavelength: 248 nm), and now an ArF excimer laser (wavelength: 193 nm) is being used. Further, in order to be prepared for an integrated circuit for the next generation where the line width of a circuit pattern will be less than 100 nm, it is considered to be prospective to employ a F$_2$ laser (wavelength: 157 nm) as the exposure light source, but it is considered that even this can not cover beyond a generation of a line width of 70 nm.

Under these circumstances, a lithographic technique employing typically a light having a wavelength of 13 nm among EUV light (extreme ultraviolet light) as the exposure light source, has attracted attention, as it may be applied to the printing of feature sizes of 50 nm and smaller. The image-forming principle of the EUV lithography (hereinafter referred to as "EUVL") is the same as the conventional photolithography to such an extent that a mask pattern is transferred by means of an optical projection system. However, in the energy region of EUV light, there is no material to let the light pass therethrough. Accordingly, a refraction optical system can not be used, and an optical system will be required to be a reflection optical system in all cases.

The optical material for the exposure device to be used for EUVL will be a photomask, a mirror or the like, and it is basically constituted of (1) a base material, (2) a reflective multilayer formed on the base material and (3) an absorber layer formed on the reflective multilayer. For the multilayer, it is studied to form layers of Mo/Si alternately, and for the absorber layer, it is studied to use Ta or Cr as the layer-forming material. As the base material, a material having a low thermal expansion coefficient is required so that no strain will be formed even under irradiation with EUV light, and a glass having a low thermal expansion coefficient is being studied.

TiO$_2$—SiO$_2$ glass is known to be a very low thermal expansion material having a coefficient of thermal expansion (CTE) smaller than quartz glass, and the coefficient of thermal expansion can be controlled by the TiO$_2$ content in the glass, whereby it is possible to obtain a zero expansion glass having a coefficient of thermal expansion being close to zero. Accordingly, TiO$_2$—SiO$_2$ glass is prospective as a material to be used for an optical material for the exposure device for EUVL.

In a conventional method for preparing TiO$_2$—SiO$_2$ glass, firstly, a silica precursor and a titania precursor are, respectively, converted into a vapor form, and then mixed. Such a vapor form mixture is fed into a burner and thermally decomposed to form TiO$_2$—SiO$_2$ glass particles. Such TiO$_2$—SiO$_2$ glass particles will be deposited in a refractory container and at the same time will be melted to form TiO$_2$—SiO$_2$ glass. However, in TiO$_2$—SiO$_2$ glass prepared by this method, the temperature region where the coefficient of thermal expansion becomes substantially zero, is limited to about room temperature.

Further, U.S. patent application publication No. 2002/157421 discloses a method which comprises forming a TiO$_2$—SiO$_2$ porous glass body, converting it to a glass body, and then obtaining a mask substrate therefrom.

At the time of forming a reflective layer, the optical material for the exposure device for EUVL will have a temperature of about 100° C. Further, at the time of exposure, high energy rays will be irradiated, whereby the temperature of the material may locally increase.

Accordingly, the optical material for the exposure device for EUVL is desired to have a wide temperature region where the coefficient of thermal expansion becomes substantially zero. However, with conventional TiO$_2$—SiO$_2$ glass, the temperature region where the coefficient of thermal expansion becomes substantially zero, is narrow, and such is inadequate to be used for an optical material for the exposure device for EUVL.

DISCLOSURE OF THE INVENTION

Embodiment 1 of the present invention provides a silica glass containing TiO$_2$, which has a fictive temperature of at most 1,200° C., an OH group concentration of at most 600 ppm (based on mass, the same applies hereinafter) and a coefficient of thermal expansion of 0±200 ppb/° C. from 0 to 100° C.

Embodiment 2 provides a silica glass containing TiO$_2$, which has a fictive temperature of at most 1,100° C., an OH group concentration of at most 600 ppm and a coefficient of thermal expansion of 0±200 ppb/° C. from −50 to 150° C.

Embodiment 3 provides the silica glass containing TiO$_2$ according to Embodiment 2, which has a fictive temperature of at most 850° C.

Embodiment 4 provides the silica glass containing TiO$_2$ according to Embodiment 1, 2 or 3, which has an OH group concentration of at most 400 ppm.

Embodiment 5 provides the silica glass containing TiO$_2$ according to Embodiment 1, 2 or 3, of which the fluctuation of the refractive index (Δn) is at most 2×10$^{-4}$ within an area of 30 mm×30 mm in at least one plane.

Embodiment 6 provides a process for producing a silica glass containing TiO$_2$, which comprises:

(a) a step of forming a porous glass body by depositing and growing on a target quartz glass particles obtained by flame hydrolysis of a Si precursor and a Ti precursor as glass-forming materials;

(b) a step of heating the porous glass body to a vitrification temperature to obtain a vitrified glass body;

(c) a step of heating the vitrified glass body to a temperature above near the softening temperature and forming it in a desired shape to obtain a formed glass body; and (d) a step of carrying out annealing treatment wherein the formed glass body is held at a temperature exceeding 500° C.

for a predetermined time, and then, the temperature is lowered to 500° C. at an average cooling rate of at most 10° C./hr.

According to the present invention, it is possible to obtain $TiO_2$—$SiO_2$ glass having a small change in the coefficient of thermal expansion by temperature i.e. a wide temperature range where the coefficient of thermal expansion becomes to be substantially zero and being excellent in the uniformity of the mechanical characteristics and the coefficient of the thermal expansion in glass. Accordingly, it is very useful as a material for a component constituting an optical system to be used for EUVL.

Figure 1:
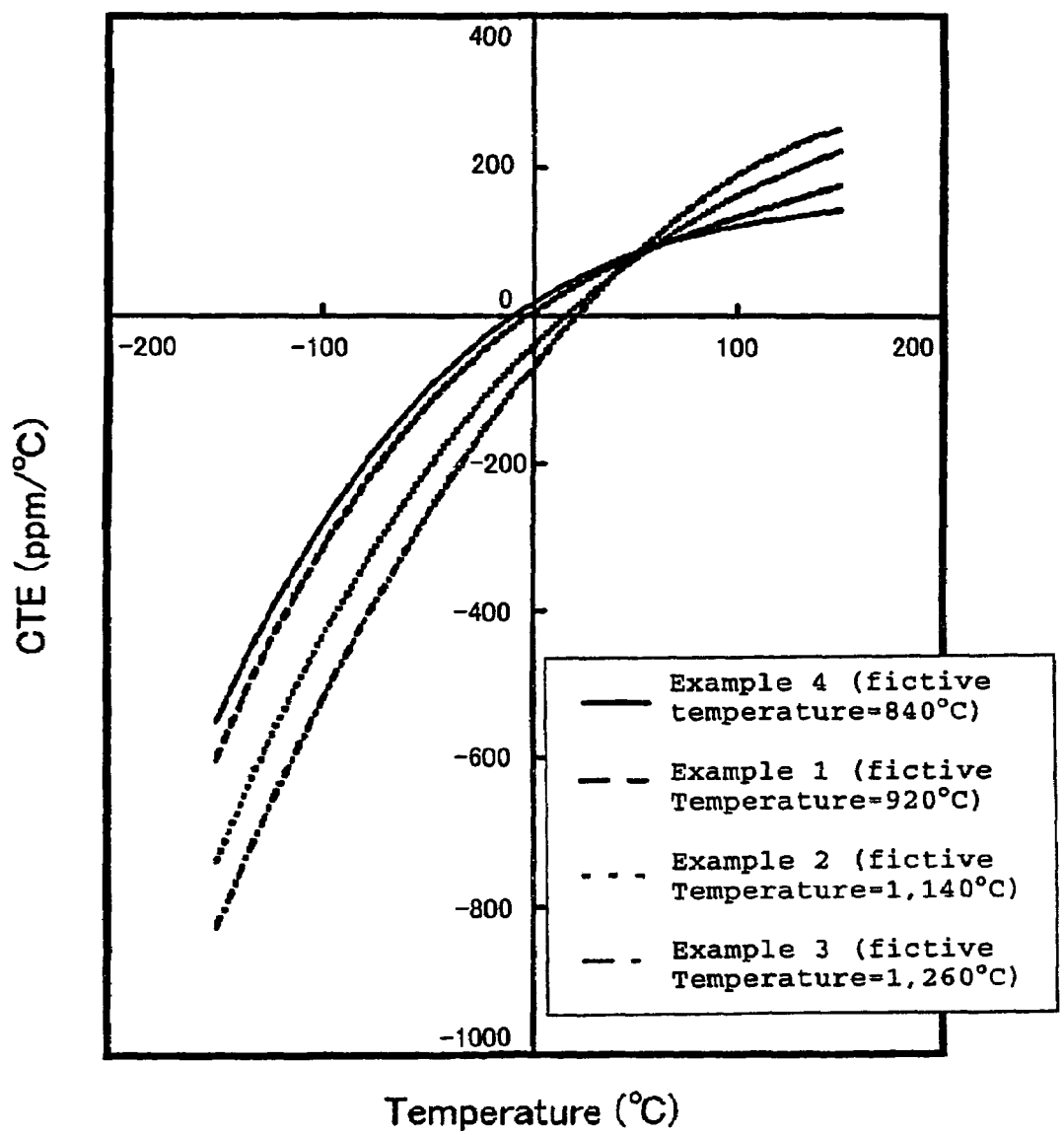
FIG. 1 shows the results of measurement of the coefficients of thermal expansion of the $TiO_2$—$SiO_2$ glasses in Examples 1 to 4.

BEST MODE FOR CARRYING OUT THE INVENTION $TiO_2$—$SiO_2$ glass is known to have a coefficient of thermal expansion which changes depending upon the concentration of $TiO_2$ contained, and the coefficient of thermal expansion of $TiO_2$—$SiO_2$ glass containing about 7 mass % of $TiO_2$ becomes substantially zero at near room temperature.

The $TiO_2$—$SiO_2$ glass of the present invention is preferably a silica glass containing from 1 to 12 mass % of $TiO_2$. If the content of $TiO_2$ is less than 1%, zero expansion may not be accomplished, and if it exceeds 12 mass %, the coefficient of thermal expansion is likely to be negative. The content of $TiO_2$ is more preferably from 5 to 9 mass %.

In the present invention, the fictive temperature is at most 1,200° C., preferably at most 1,100° C., particularly preferably at most 1,000° C.

The present inventors have found that the fictive temperature and the extent of the temperature range for zero expansion are related. Namely, if the fictive temperature exceeds 1,200° C., the temperature range for zero expansion tends to be narrow, and such a material tends to be inadequate as a material to be used for an optical material for the exposure device for EUVL. In this specification, the-temperature range within which the coefficient of thermal expansion of glass becomes substantially zero, is referred to also as the temperature range for zero expansion. To broaden the temperature range for zero expansion, the fictive temperature is preferably at most 950° C., more preferably at most 900° C., particularly preferably at most 850° C.

In order to obtain the fictive temperature in the present invention, a method is effective wherein the glass material is held at a temperature exceeding 500° C., particularly at a temperature of from 600 to 1,200° C., for at least 5 hours and then cooled to 500° C. at an average cooling rate of at most 10° C./hr. Accordingly, a $TiO_2$—$SiO_2$ glass body was held at 900° C. for 100 hours, then cooled to 500° C. at a rate of 10° C./hr and then cooled in air, whereby the fictive temperature of the $TiO_2$—$SiO_2$ glass body became 860° C.

The higher the holding temperature, the shorter the holding time. In a case where the holding temperature is low, it takes time for the structural relaxation, and to obtain a proper fictive temperature, the holding time is required to be made long.

The fictive temperature is measured as follows. With respect to polished $TiO_2$—$SiO_2$ glass, the absorption spectrum is measured by means of an infrared spectrometer (Magna 760, manufactured by Nikolet Company). At that time, the data taking interval is set to be about 0.5 $cm^{-1}$, and for the absorption spectrum, an average value obtained by scanning 64 times, is employed. In the infrared absorption spectrum thus obtained, the peak observed at about 2,260 $cm^{-1}$ is attributable to an overtone of stretching vibration by the Si—O—Si bond of $TiO_2$—$SiO_2$ glass. The fictive temperature is obtained from this peak position by using a calibration curve which is prepared by glass having the same composition having a known fictive temperature. Otherwise, the reflection spectrum of the surface is measured in a similar manner by-means of a similar infrared spectrometer. In the infrared reflection spectrum obtained in such a manner, the largest peak observed at about 1,120 $cm^{-1}$ is attributable to the stretching vibration by the Si—O—Si bond of $TiO_2$—$SiO_2$ glass. The fictive temperature is obtained from this peak position by using a calibration curve which is prepared by glass of the same composition having a known fictive temperature.

In the present invention, the OH group concentration is preferably at most 600 ppm, more preferably at most 400 ppm, particularly preferably at most 200 ppm.

If the OH group concentration is high, the structural relaxation is fast, whereby it is considered that the fictive temperature distribution is likely to be large in the case of a glass body having a large size.

It is known long before with respect to quartz glass that the OH group concentration is influential over the structural relaxation of glass (AIP•Conf.•Proc•469, 507•(1999)). It is considered that OH groups constitute end groups to cut networks in the network structure of glass, and the more the end groups, the more easily the structural relaxation of glass becomes. Namely, as the number of OH groups increases, the time for structural relaxation will be short, and thus, the fictive temperature will be more susceptible to the influence of the temperature distribution during cooling.

The production process to obtain $TiO_2$—$SiO_2$ glass having a relatively low OH group concentration is not particularly limited, but a soot process may be used. The soot process is a production process which comprises depositing $TiO_2$—$SiO_2$ glass particles (soot) obtained by flame hydrolysis or thermal decomposition of a Si precursor and a Ti precursor as glass-forming materials, followed by heating to a vitrification temperature, to obtain a vitrified $TiO_2$—$SiO_2$ glass body. Here, as such a soot process, a MCVD process, an OVD process and a VAD process are, for example, available depending upon the manner of preparation of the soot.

The OH group concentration is measured as follows. The measurement is carried out by means of an infrared spectrophotometer, and from the absorption peak at a wavelength of 2.7 μm, the OH group concentration is obtained (J. P. Williams et. Al., American Ceramic Society Bulletin, 55(5), 524, 1976). The detection limit by this method is 0.1 ppm.

According to the present invention, within a wide temperature range of from 0 to 100° C., $TiO_2$—$SiO_2$ glass can be made to be a zero expansion glass, of which the coefficient of thermal expansion is within a range of 0±200 ppb/° C. Further, in a case where the fictive temperature of $TiO_2$—$SiO_2$ glass is at most 1,100° C., the temperature range where the coefficient of thermal expansion becomes substantially zero, will be wider, and within a range of from −50 to 150° C., the coefficient of thermal expansion can be made within a range of 0±200 ppb/° C.

The coefficient of thermal expansion is measured within a range of from −150 to +200° C. by means of a laser interferometer type thermal expansion meter (LIX-1, manufactured by ULVAC-RIKO, Inc.).

In this specification, "fluctuation of the fictive temperature" is defined as the difference between the maximum value and the minimum value of the fictive temperature within 30 mm×30 mm in at least one plane. The fluctuation of the fictive temperature is preferably within 100° C., particularly preferably within 70° C. If the fluctuation of the fictive temperature exceeds the above range, the coefficient of thermal expansion may have a difference depending upon the position.

The fluctuation of the fictive temperature can be measured as follows. A $TiO_2$—$SiO_2$ glass body formed to have a prescribed size, is sliced to obtain a $TiO_2$—$SiO_2$ glass block of 50 mm×50 mm×10 mm. With respect to an area of 50 mm×50 mm of this $TiO_2$—$SiO_2$ glass block, the fictive temperature is measured in accordance with the above-mentioned method with an interval of 10 mm pitch, whereby the fluctuation of the fictive temperature of the formed $TiO_2$—$SiO_2$ glass body is obtained.

In this specification, "fluctuation of the OH group concentration" is defined to be the difference between the maximum value and the minimum value of the OH group concentration within 30 mm×30 mm in at least one plane. The fluctuation of the OH group concentration is preferably within 50 ppm, more preferably within 30 ppm, particularly preferably within 10 ppm. If the fluctuation of the OH group concentration exceeds the above range, the difference in the structural relaxation time becomes large, and the fictive temperature tends to be different depending upon the position.

The fluctuation of the OH group concentration can be measured as follows. A $TiO_2$—$SiO_2$ glass body formed to have a prescribed size is sliced to obtain a $TiO_2$—$SiO_2$ glass block of 50 mm×50 mm×10 mm. With respect to an area of 50 mm×50 mm of this $TiO_2$—$SiO_2$ glass block, the OH group concentration is measured in accordance with the above-mentioned method with a 10 mm pitch, whereby the fluctuation of the OH group concentration of the formed $TiO_2$—$SiO_2$ glass body is obtained.

When $TiO_2$—$SiO_2$ glass is used as an optical material for the exposure device for EUVL, it is very important to make the $TiO_2$/$SiO_2$ ratio in the glass to be uniform with a view to minimizing the distribution of the coefficient of thermal expansion within the material. A fluctuation of this $TiO_2$/$SiO_2$ ratio is influential over the refractive index of glass, and as an index for the uniformity of the $TiO_2$—$SiO_2$ composition, the fluctuation of the refractive index ($\Delta n$) may be used. In the present invention, $\Delta n$ is defined to be the difference between the maximum value and the minimum value of the refractive index within 30 mm×30 mm in at least one plane. An is preferably within $2\times10^{-4}$, particularly preferably within $1.5\times10^{-4}$. If An exceeds the above range, the fluctuation of the coefficient of thermal expansion is likely to be large. To obtain such $\Delta n$, it is effective to use the soot process.

$\Delta n$ is measured as follows. From a $TiO_2$—$SiO_2$ glass body formed into a cube of 40 mm×40 mm×40 mm, each side of the cube is sliced in a thickness of 1 mm to obtain a plate-shaped $TiO_2$—$SiO_2$ glass block of 38 mm×38 mm×1 mm. By a Fizeau interferometer, a helium neon laser beam is vertically irradiated to an area of 38 mm×38 mm of this glass block by an oil-on-plate method, whereby the fluctuation of the refractive index is measured within the area of 38 mm×38 mm.

With the $TiO_2$—$SiO_2$ glass obtainable by the present invention, when the fluctuation of the fictive temperature is within 100° C., the fluctuation of the OH group concentration is within 50 ppm and $\Delta n$ is within $2\times10^{-4}$, the distribution of the coefficient of the thermal expansion can be made to be within 30 ppb/° C. within 30 mm×30 mm in at least one plane, and such is most suitable as an optical material for the exposure device for EUVL.

The distribution of the coefficient of thermal expansion is measured as follows. A $TiO_2$—$SiO_2$ glass body formed to have a prescribed size is cut into small pieces of $TiO_2$—$SiO_2$ glass of 10 mm×10 mm×10 mm. The coefficient of thermal expansion of each of such small pieces is measured in accordance with the above-described method to obtain the fluctuation of the coefficient of thermal expansion of the formed $TiO_2$—$SiO_2$ glass block.

The following process can be employed for producing the $TiO_2$—$SiO_2$ glass of the present invention.

Step (a)

$TiO_2$—$SiO_2$ glass particles obtained by flame hydrolysis of a Si precursor and a Ti precursor as glass-forming materials, are deposited and grown on a target to form a porous $TiO_2$—$SiO_2$ glass body. The glass-forming materials are not particularly limited so long as they are materials capable of being gasified. However, the Si precursor may, for example, be a silicon halide compound, such as a chloride such as $SiCl_4$, $SiHCl_3$, $SiH_2Cl_2$ or $SiH_3Cl$, a fluoride such as $SiF_4$, $SiHF_3$ or $SiH_2F_2$, a bromide such as $SiBr_4$ or $SiHBr_3$ or an iodide such as $SiI_4$, or an alkoxy silane represented by $R_nSi(OR)_{4-n}$ (wherein R is a $C_{1-4}$ alkyl group, and n is an integer of from 0 to 3), and the Ti precursor may, for example, be a titanium halide compound such as $TiCl_4$ or $TiBr_4$, or a titanium alkoxide represented by $R_nSi(OR)_{4-n}$ (wherein R is a $C_{1-4}$ alkyl group, and n is an integer of from 0 to 3). Further, as the Si precursor and the Ti precursor, a compound of Si and Ti, such as a silicon-titanium alkoxide, may also be used.

As the target, a quartz glass target (such as a target as disclosed in JP-B-63-24973) may be used. It may not be limited to a rod shape, and a plate-shaped target may be employed.

Step (b)

The porous $TiO_2$—$SiO_2$ glass body obtained in step (a) is heated to a vitrification temperature for vitrification to obtain a vitrified $TiO_2$—$SiO_2$ glass body. The vitrification temperature is usually from 1,400 to 1,700° C., particularly preferably from 1,450 to 1,650° C.

The atmosphere is preferably an atmosphere of 100% inert gas such as helium or an atmosphere containing an inert gas such as helium, as the main component. The pressure may be a reduced pressure or a normal pressure. Especially in the case of a normal pressure, helium gas may be employed. In the case of a reduced pressure, a pressure of at most 13,000 Pa is preferred. In this specification, "Pa" is meant for an absolute pressure i.e. not a gauge pressure.

Further, by inserting the following step (a)-1 between the steps (a) and (b), it is possible to easily control the concentration of OH groups contained in the vitrified $TiO_2$—$SiO_2$ glass obtained in the step (b).

Step (a)-1: It is possible to reduce the OH group concentration in the porous $TiO_2$—$SiO_2$ glass body by maintaining the porous $TiO_2$—$SiO_2$ glass body in an atmosphere containing a halogen such as chlorine or fluorine.

Step (c)

The vitrified $TiO_2$—$SiO_2$ glass body obtained in step (b) is heated to a temperature above near the softening temperature and formed into a desired shape to obtain a formed $TiO_2$—$SiO_2$ glass body. The temperature for forming is preferably from 1,500 to 1,800° C. If it is lower than 1,500° C., no substantial deadweight transformation takes place, since the viscosity of the $TiO_2$—$SiO_2$ glass is high, and growth of cristobalite being a crystalline phase of $SiO_2$ or growth of rutile or anatase being a crystalline phase of $TiO_2$ takes place, thus leading to so-called devitrification. If the temperature exceeds 1,800° C., vaporization of $SiO_2$ tends to be not negligible.

Step (d)

The fictive temperature of the $TiO_2$—$SiO_2$ glass is controlled by carrying out annealing treatment wherein the formed $TiO_2$—$SiO_2$ glass body obtained in step (c) is held at a temperature exceeding 500° C., for example, at a temperature of from 600 to 1,200° C., for at least 5 hours, and then, the temperature is lowered to not higher than 500° C. at an average cooling rate of at most 10° C./hr. After the temperature is lowered to not higher than 500° C., the glass body may be cooled. The atmosphere in such a case is preferably an atmosphere of 100% inert gas such as helium, argon or nitrogen or an atmosphere containing such an inert gas as the main component, or an atmosphere of air, and the pressure is preferably a reduced pressure or a normal pressure.

The $TiO_2$—$SiO_2$ glass obtained by the present invention is suitable as an optical material for the exposure device for semiconductors, such as a mask base material, a mirror base material or a stage to be used for EUVL.

Now, the present invention will be described in further detail with reference to Examples. However, it should be understood that the present invention is by no means restricted to such specific Examples. In the glass compositions in the following Examples, $TiO_2$=7.4 mass %, and $SiO_2$=92.6 mass %, in all cases.

EXAMPLE 1

$TiO_2$—$SiO_2$ glass particles obtained by gasifying $TiCl_4$ and $SiCl_4$ as glass-forming materials for $TiO_2$—$SiO_2$ glass, respectively, then mixing them and feeding them to heat hydrolysis (flame hydrolysis) in oxyhydrogen flame, were deposited and grown on a target to form a porous $TiO_2$—$SiO_2$ glass body having a diameter of 8 cm and a length of 12 cm (step (a)).

The obtained porous $TiO_2$—$SiO_2$ glass body was heated to 1,550° C. in an atmosphere of 100% He and held at this temperature for 10 hours for vitrification to obtain a vitrified $TiO_2$—$SiO_2$ glass body (step (b))

The obtained vitrified $TiO_2$—$SiO_2$ glass body was heated to 1,600° C. i.e. higher than the softening point for deadweight transformation and formed into a block shape having a predetermined size to obtain a formed $TiO_2$—$SiO_2$ glass body (step (c))

The obtained formed $TiO_2$—$SiO_2$ glass body was set in an electric furnace and held at 950° C. for 100 hours. Then, the temperature was lowered to 500° C. at a rate of 5° C./hr, and then the glass body was cooled to room temperature (step (d)) to obtain $TiO_2$—$SiO_2$ glass.

EXAMPLE 2

In the step (d) in Example 1, the cooling conditions after slicing were changed, and the formed $TiO_2$—$SiO_2$ glass body was set in an electric furnace and held at 1,200° C. for 20 hours. Then, the temperature was lowered to 500° C. at a rate of 5° C./hr, and then, the glass body was cooled to room temperature. Other than this, in the same manner as in Example 1, $TiO_2$—$SiO_2$ glass was obtained.

EXAMPLE 3

In the step (d) in Example 1, the cooling conditions after slicing were changed, and the formed $TiO_2$—$SiO_2$ glass body was set in an electric furnace and held at 1,300° C. for 2 hours. Then, the temperature was lowered to 500° C. at a rate of 5° C./hr, and then, the glass body was cooled to room temperature. Other than this, in the same manner as in Example 1, $TiO_2$—$SiO_2$ glass was obtained.

EXAMPLE 4

In the step (d) in Example 1, the cooling conditions after slicing were changed, and the formed $TiO_2$—$SiO_2$ glass body was set in an electric furnace and held at 800° C. for 150 hours. Then, the temperature was lowered to 500° C. at a rate of 5° C./hr, and then, the glass body was cooled to room temperature. Other than this, in the same manner as in Example 1, $TiO_2$—$SiO_2$ glass was obtained.

The results of measurements in these Examples 1 to 4 are summarized in Table 1, and the results of measurements of the fictive temperature are summarized in FIG. 1. Here, the methods for evaluation of the OH group concentration, the coefficient of thermal expansion and the fictive temperature were in accordance with the above-mentioned measuring methods, respectively. With respect to the fluctuation of the refractive index ($\Delta n$), evaluation was carried out with a sample of 30 mm×30 mm×5 mm. Here, Examples 1, 2 and 4 are Examples of the present invention, and Example 3 is a Comparative Example.

In Example 1, the fictive temperature was lower than 1,100° C., and the coefficient of thermal expansion was within a range of 0±200 ppb/° C. in both of two types of temperature ranges of from 0 to 100° C. and from −50 to 150° C. In Example 2, the fictive temperature was lower than 1,200° C., and the coefficient of thermal expansion was within a range of 0±200 ppb/° C. in a temperature range of from 0 to 100° C. In Example 3, the fictive temperature was higher than 1,200° C., and the coefficient of thermal expansion was not within the range of 0±200 ppb/° C. in both of two types of temperature ranges of from 0 to 100° C. and from −50 to 150° C. In Example 4, the fictive temperature was particularly low (lower than 850° C.), and the coefficient of thermal expansion was within the range of 0±150 ppb/° C. in both of the two types of temperature ranges of from 0 to 100° C. and −50 to 150° C.

TABLE 1

| | OH group concentration (ppm) | Fictive temperature (° C.) | CTE (ppb/° C.) within from 0 to 100° C. ○: −200 ≦ CTE ≦ 200 X: CTE < −200 or CTE > 200 | CTE (ppb/° C.) within from −50 to 150° C. ○: −200 ≦ CTE ≦ 200 X: CTE < −200 or CTE > 200 | Margin of fluctuation of refractive index (ppm) |
|---|---|---|---|---|---|
| Ex. 1 | 70 | 920 | ○ | ○ | 70 |
| Ex. 2 | 70 | 1,140 | ○ | X | 75 |
| Ex. 3 | 70 | 1,260 | X | X | 75 |
| Ex. 4 | 70 | 840 | ○ | ○ | 70 |

EXAMPLE 5

In Example 1, the formed $TiO_2$—$SiO_2$ glass body was cut into small pieces of $TiO_2$—$SiO_2$ glass of 30 mm×30 mm×10 mm. The obtained small piece of $TiO_2$—$SiO_2$ glass was set in an electric furnace and held at 900° C. for 100 hours, and then, the temperature was lowered to 500° C. at a rate of 5° C./hr. Thereafter, it was cooled to room temperature (Example 5-annealing). Further, another small piece was held at 900° C. for 100 hours and then quenched in air (Example 5-rapid cooling). Other than this, in the same manner as in Example 1, $TiO_2$—$SiO_2$ glass was obtained.

EXAMPLE 6

A 200 mm×200 mm×10 mm block of ULE (tradename) glass manufactured by Corning Inc. known as zero expansion $TiO_2$—$SiO_2$ glass, was further cut into small pieces of $TiO_2$—$SiO_2$ glass of 30 mm×30 mm×10 mm. The obtained small piece of $TiO_2$—$SiO_2$ glass was set in an electric furnace and held at 900° C. for 100 hours, and then, the temperature was lowered to 500° C. at a rate of 5° C./hr. Thereafter, it was cooled to room temperature (Example 6-annealing). Further, another small piece was held at 900° C. for 100 hours and then quenched in air (Example 6-rapid cooling).

The results of measurements in these Examples 5 and 6 are summarized in Table 2. Here, Example 5 is an Example of the present invention, and Example 6 is a Comparative Example.

TABLE 2

| | OH group concentration (ppm) | Fictive temperature (° C.) | Difference in fictive temperature between annealing sample and rapid cooling sample |
| --- | --- | --- | --- |
| Ex. 5 | 70 | Annealing: 860 Rapid cooling: 900 | 40 |
| Ex. 6 | 880 | Annealing: 790 Rapid cooling: 900 | 110 |

In Example 5, the OH group concentration is low, whereby the difference in fictive temperature between annealing sample and rapid cooling sample is within 100° C. In Example 6, the OH group concentration is high, whereby the difference in fictive temperature between annealing sample and rapid cooling sample is not within 100° C.

These results indicate that when a $TiO_2$—$SiO_2$ glass body having a large diameter is subjected to annealing treatment, the fictive temperature distribution of the glass body will be within 100° C. if the OH group concentration is low. However, if the OH group concentration is high, it is likely to be over 100° C. Namely, these results indicate that if the OH group concentration is low, the fluctuation of the fictive temperature will be small, the uniformity of the coefficient of thermal expansion will be improved, and such is suitable for an optical material for the exposure device for EUV.

The entire disclosures of Japanese Patent Application No. 2003-100495 filed on Apr. 3, 2003, Japanese Patent Application No. 2003-164669 filed on Jun. 10, 2003 and Japanese Patent Application No. 2004-065275 filed on Mar. 9, 2004 including specifications, claims, drawings and summaries are incorporated herein by reference in their entireties.

What is claimed is:

1. A silica glass containing $TiO_2$, which has a fictive temperature of at most 1100° C., an OH group concentration of at most 600 ppm and a coefficient of thermal expansion of 0±200 ppb/° C. from 0 to 100° C.

2. The silica glass containing $TiO_2$ according to claim 1, which has an OH group concentration of at most 400 ppm.

3. The silica glass containing $TiO_2$ according to claim 1, wherein the content of $TiO_2$ in the glass ranges from 1 to 12 mass %.

4. The silica glass containing $TiO_2$ according to claim 1, wherein the fictive temperature is at most 1000° C.

5. The silica glass containing $TiO_2$ according to claim 1, wherein the OH group concentration is at most 400 ppm.

6. A silica glass containing $TiO_2$, which has a fictive temperature of at most 1,100° C., an OH group concentration of at most 600 ppm and a coefficient of thermal expansion of 0±200 ppb/° C. from −50 to 150° C.

7. The silica glass containing $TiO_2$ according to claim 6, which has a fictive temperature of at most 850° C.

8. A $TiO_2$—$SiO_2$ optical glass, comprising:
a silica glass having a fictive temperature of at most 1100° C., an OH group concentration of at most 600 ppm and a coefficient of thermal expansion of 0±200 ppb/° C. from 0 to 100° C., the distribution of the coefficient of thermal expansion throughout the silica glass being determined by fluctuations in the refractive index (Δn) which are determined by the difference between the maximum value and the minimum value of the refractive index determinations in at least one plane of the glass over an area of 30 mm×30 mm, is at most $2 \times 10^{-4}$.

* * * * *